United States Patent
Spinelli

Patent Number: 5,772,741
Date of Patent: Jun. 30, 1998

[54] AQUEOUS INK JET INK COMPOSITIONS

[75] Inventor: Harry Joseph Spinelli, Wilmington, Del.

[73] Assignee: E. I. du Pont de Nemours and Company, Wilmington, Del.

[21] Appl. No.: 739,986

[22] Filed: Oct. 30, 1996

Related U.S. Application Data

[60] Provisional application No. 60/017,988, May 20, 1996.

[51] Int. Cl.$^6$ ................................... C09D 11/02
[52] U.S. Cl. ................................. 106/31.25; 106/31.86
[58] Field of Search .............................. 106/31.25, 31.86

[56] References Cited

U.S. PATENT DOCUMENTS

| | | | |
|---|---|---|---|
| 4,069,179 | 1/1978 | Jones | 106/31.25 |
| 4,981,517 | 1/1991 | DeSanto, Jr. et al. | 106/31.25 |
| 5,047,084 | 9/1991 | Miler et al. | 106/31.25 |
| 5,226,957 | 7/1993 | Wickramanayake et al. | 106/25 R |
| 5,231,131 | 7/1993 | Chu et al. | 524/504 |
| 5,342,440 | 8/1994 | Wickramanayake | 106/22 R |
| 5,345,254 | 9/1994 | Wong et al. | 347/100 |
| 5,531,816 | 7/1996 | Wickramanayake | 106/20 R |

FOREIGN PATENT DOCUMENTS

| | | | |
|---|---|---|---|
| 0 564 147 A1 | 10/1993 | European Pat. Off. | C09D 11/00 |

*Primary Examiner*—Helene Klemanski

[57] ABSTRACT

Ink jet ink compositions comprising an aqueous continuous phase; a discontinuous, non-aqueous phase comprising a pigment, a dispersant and a non-aqueous carrier; and at least one emulsifier exhibit excellent resistance to water and highliter smear and dramatically improve bleed in printed elements.

10 Claims, No Drawings

AQUEOUS INK JET INK COMPOSITIONS

CROSS REFERENCE TO RELATED APPLICATIONS

This application claims the benefit of U.S. Provisional Application No. 60/017,988, filed May 20, 1996.

BACKGROUND OF THE INVENTION

This invention relates to aqueous ink jet inks and more particularly to aqueous ink jet inks containing organic pigment dispersions.

Ink jet printing is a non-impact method for recording information in response to an electronic signal, such as that generated by a computer. The electronic signal causes the ink jet printhead to produce droplets of ink and deposit the droplets on a print media, such as paper or transparent film. Ink jet printers have found wide acceptance, particularly in the office printer market, because of their relatively low cost, reliability, print quality and relativelt quiet operation.

The mechanism by which ink jet printers produce and deposit droplets of ink can be characterized as thermal and non-thermal. In thermal ink jet printers, one of more elements in the printhead is heated, which causes the ink to expand and creates a bubble. When the bubble has reached the proper size, a droplet of ink is expelled from the printhead. For this reason, thermal ink jet printers are also known as "bubble jet" printers. Non-thermal ink jet printers are those which do not use heat as the means of producing/expelling the ink droplets. An example of a non-thermal printer is one which uses a piezoelectric element in the printhead to expell droplets of ink. Because of the repeated heating cycles, not all ink jet inks are suitable for use in thermal ink jet printers.

Both dyes and pigments have been used as colorants for ink jet inks. While dyes typically offer superior color properties compared to pigments, they have recently lost favor because of the disadvantages attendant to their use. For example, the dyes used in aqueous inks are usually water soluble and remain so after drying. In addition, dye-based inks tend to have poor lighfastness and can fade even under office lighting conditions. Accordingly, pigments have become the colorants of choice in ink jet printing.

Aqueous pigmented ink jet inks present their own challenges. Because pigments are not water solouble, they need to be dispersed into the aqueous carrier of the ink in a manner which is resistant to settling and flocculation. For this reason, it is common for pigmented ink jet inks to comprise a solid dispersion of pigment and polymer, which is then dispersed in the aqueous ink vehicle.

The use of water soluble or water dispersable colorants, whether pigments or dyes, are problematic. Because the dye or pigment dispersion used is water soluble, the ink tends to smear if it gets wet or when contacted with felt tip pens or highlighters. Water soluble dyes and pigment dispersions also present a condition known as bleed; that is, the mutual color diffusion between two adjacent (or overlying) ink droplets. When the adjacent droplets are of different hues, the phenomenon is known as color bleed, which is highly undesireable in ink jet printing. Controlling bleed has been given much attention in the ink jet art in recent years and has taken many forms. For example, bleed control can be accomplished by providing a lag time between deposition of adjacent droplets, such that the inks are given sufficient time to dry before printing the adjacent droplet. It can also be accomplished by using heaters or dryers to increase the speed of drying of the inks. Finally, it can be accomplished by modifying the inks themselves to try and make the inks "incompatible" with one another. U.S. Pat. Nos. 5,226,957 and 5,342,440 teach a microemulsion ink jet ink comprising a water-insoluble dye and a water-insoluble organic solvent emuslified in an aqueous ink vehicle, which are said to control bleed in printed elements.

Despite these recent advancements, there is a need in the art for improved aqueous ink jet inks and an improved method of making multi-colored printed elements which do not present the bleed problems noted above and which have greater utility than the other known methods.

SUMMARY OF THE INVENTION

The present invention provides an ink jet ink composition comprising:

(a) an aqueous continuous phase;

(b) a discontinuous, non-aqueous phase comprising a pigment, a dispersant and a non-aqueous carrier; and (c) at least one emulsifier.

The inks of the invention are stable, have low viscosity, exhibit excellent print quality, provide excellent smear resistance after drying and good decap or crusting time. When used in combination with other inks, the inks of this invention result in printed images having reduced bleed.

The inks compositions may be used with a variety of ink jet printers such as continuous, piezoelectric, drop-on-demand and thermal or bubble jet drop-on-demand, and are particularly adapted for use in thermal ink jet printers. These inks may also be useful in air brush printing devices.

DETAILED DESCRIPTION OF THE INVENTION

The invention provides an ink jet ink composition which is particularly suited for use in ink jet printers in general, and thermal ink jet printers in particular. The ink jet ink composition encompasses pigment-based inks comprising an aqueous continuous phase, and a non-aqueous, discontinuous phase comprising a pigment, a dispersant (usually structured polymeric dispersants), a non-aqueous carrier medium and at least one emulsifier. These inks are stable over long periods, both in storage and in the printer. Either water soluble or water insoluble dyes may be added, if desired, to enhance the color performance of the inks. Preferably, the dyes are water insoluble dyes and are added to the organic pigment dispersions. The inks may be adapted to the requirements of a particular ink jet printer to provide a balance of light stability, smear resistance, viscosity, surface tension, high optical density, and crust resistance..

Aqueous Continuous Phase

The aqueous continuous phase or carrier medium is water or a mixture of water and at least one water soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698, the disclosure of which is incorporated herein by reference. A mixture of water and a polyhydric alcohol, such as diethylene glycol, is preferred as the aqueous continuous phase or carrier medium.

If a mixture of water and a water-soluble solvent is used, the aqueous carrier medium usually contains from about 30% to about 95% water with the balance (i.e., 70 to 5%) being the water-soluble solvent. The preferred compositions are approximately 60% to about 95% water, based on the total weight of the aqueous carrier medium.

The amount of aqueous continuous phase or carrier medium in the ink is in the range of approximately 40 to 99.8%, preferably 70 to 99.8%, based on total weight of the ink when an organic pigment is selected; and approximately 25 to 99.8%, preferably 50 to 99.8% when an inorganic pigment is selected.

Non-Aqueous, Discontinuous Phase

The non-aqueous discontinuous phase comprises a pigment, a dispersant and a non-aqueous carrier.

Pigment

Useful pigments comprise a wide variety of organic and inorganic pigments, alone or in combination. The pigment particles are sufficiently small to permit free flow of the ink through the ink jet printing device, especially at the ejecting nozzles that usually have a diameter ranging from 10–50 microns. The particle size also has an influence on the pigment dispersion stability, which is critical throughout the life of the ink. Brownian motion of minute particles will help prevent the particles from settling. It is also desirable to use small particles for maximum color strength. The range of useful pigment particle size is approximately 0.005–15 microns. Preferably, the pigment particle size should range from 0.005–5 microns and most preferably, from 0.01–0.3 microns.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be used in practicing the invention are disclosed in U.S. Pat. No. 5,085,698, the disclosure of which is incorporated herein by reference.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

In the case of organic pigments, the ink may contain up to approximately 30% pigment by weight, but will generally be in the range of approximately 1 to 15%, preferably approximately 1 to 8%, by weight of the total ink composition for most thermal ink jet printing applications. If an inorganic pigment is selected, the ink will tend to contain higher weight percentages of the pigment than with comparable inks employing organic pigment, and may be as high as approximately 50% because inorganic pigments generally have higher specific gravities than the organic pigments.

Dispersants

The dispersant used to disperse the pigments into the non-aqueous carrier or non-aqueous soluble solvent may be a random linear, block, or graft polymer. The block polymer dispersants may be made by conventional free radical techniques using a functionalized chain transfer agent, as described in U.S. Pat. No. 4,032,698 or by living polymerization techniques such as Group Transfer Polymerization as described in U.S. Pat. No. 4,656,226, the disclosures of which are incorporated herein. The dispersant may be present in the amount of 0.1 to 10%, preferably 0.5 to 3%, based on the total weight of the ink.

Non-aqueous Carrier

Non-aqueous carrier is a water insoluble organic solvent such as esters, ketones, ethers, aromatics, hydrocarbons, and alcohols. The non-aqueous carrier may be present in the amount of 0.5 to 50%, preferably 5 to 30%, based on the total weight of the ink.

C8 to C22 alkanes, alkenes, and alkynes are preferred hydrocarbon solvents and may be straight chained, branched, or cyclic. Examples include heptane, octane, dodecane, and isocane. Suitable aromatic solvents include toluene, xylene, naphthalene, anthracene, naphthalene sulphonates, substituted naphthalene sulphonates, phenanthracene and mesitylene. Substituted aromatic solvents, such as cresol, benzyl alcohol, anisole, dimethoxy benzene, methyl anisole and resorcinol may also be used. Suitable ketone solvents include straight chained, branched, or cyclic ketones, such as 2 heptanone, cyclohexanone, methyl cyclohexanone. Suitable ether solvents include aliphatic, aromatic, or aralkyl ethers, such as propylene glycol phenyl ether, dipropylene glycol phenyl ether, ethyleneglycol phenyl ether, and diethylene glycol phenyl ether. Aliphatic, aromatic, and aralkyls esters, such as butyl acetate, hexyl acetate, dimethylesters of adipic acid, dimethylesters of a mixture of C4, C5, and, C6 dibasic acids, methyl octanoate, and methyl benzoate may also be used as the non-aqueous carrier. Straight chained, branched, or cyclic alcohols, such as octanol, cyclohexanol, and dimethylcyclohexanol may also be used to advantage.

Emulsifier

The emulsifier is a polymeric or monomeric compound which serves to stabilize the non-aqueous pigment dispersion in the aqueous ink vehicle. The emulsifier may be anionic, cationic or non-ionic. The emulsion stabilizer may be present in the amount of 0.01 to 10%, preferably 0.5 to 4%, based on the total weight of the ink The polymeric emulsifier may be a random linear, block, or graft polymer and can be prepared by processes well known to those skilled in the art. Some preferred block polymer emulsifiers for anionic inks are block polymers of methacrylic acid such as benzyl methacrylate//methacrylic acid BZMA//MAA 13//10, and preferred block polymer emulsifiers for cationic inks are block polymers of amino methacrylates such as benzyl methacrylate// dimethylaminoethyl methacrylate BZMA//DMAEMA 10// 20. Polymers known in the art as suitable for use in aqueous pigment dispersions, such as those disclosed in U.S. Pat. No. 5,085,698, may also be used as emulsion stabilizers.

Other Ingredients

The ink compositions may also contain other ingredients. Biocides may be used in the ink compositions to inhibit growth of microorganisms, as is well known in the art. In addition, sequestering agents such as EDTA may also be included to eliminate deleterious effects of heavy metal impurities. Other known additives, such as humectants, viscosity modifiers and other acrylic or non-acrylic polymers made also be added to improve various properties of the ink compositions as is known in the art.

Dyes may be added to enhance the color performance of the inks. They may be either aqueous (water soluble) or non-aqueous (water insoluble) dyes. Preferably the dyes are non-aqueous and are added to the organic pigment dispersions. The dyes may be present in the amount of 0 to 10%, by weight, preferably 0.01 to 4%, by weight, more preferably 0.05 to 2%, by weight, based on the total weight of the ink.

Some suitable non-aqueous or organic soluble dyes that may be added to the solvent pigment dispersions include Solvent Black (SB) 3, SB 5, SB 46, Solvent Blue 36, Solvent Blue 59, Solvent Red (SR) 1, SR 24, SR 68, Solvent Yellow (SY) 13, SY 14, SY 33, and SY 93. Examples of vat dyes include Vat Black 9, Vat Black 25, Vat Blue 1, Vat Blue 6, Vat Red 10, and Vat Yellow 4. Further examples of vat dyes include a family of Waxoline® dyes available from ICI Americas, Wilmington, Del. These dyes include Waxoline® Orange EPFW 35117; Waxoline® Red O 31833; Waxoline® Black 5BP 35115; and Waxoline® Black OBP 35109.

Examples of water-insoluble mordant dyes include Mordant Black 1, Mordant Black 9, Neazopon® Black X52 from BASF Corp., Chemical Division (Holland, Mich.), Mordant Blue 1, Mordant Red 7, Mordant Red 9, and Mordant Yellow 26. Some aqueous or water soluble dyes that may be added to the aqueous phase are disclosed in Matrick, U.S. Pat. No. 5,205,861, the disclosure of which is incorporated herein by reference.

Process of Preparation

The steps involved in preparing these inks are: (1) preparation of the non-aqueous dispersion; and (2) inverting the non-aqueous dispersion into the aqueous phase with the emulsifier. The non-aqueous dispersion can be prepared by mixing the pigment and dispersant in the non-aqueous solvent. The mixing is preferably done under high shear conditions to produce a uniform dispersion of the pigment particles in the non-aqueous solvent, such as by use of a horizontal mini mill, a ball mill, roll mills such as a 2-roll and 3-roll mills, an attritor, or by passing the mixture through a plurality of nozzles within a liquid jet interaction chamber at a liquid pressure of at least 5000 psi. An emulsifier is then added to the dispersion and the emulsified dispersion is inverted into the aqueous continuous phase.

Ink Properties

Jet velocity, separation length of the droplets, drop size and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm at 20° C. Acceptable viscosities are no greater than 20 cP, and preferably in the range of about 1.0 cP to about 10.0 cP at 20° C. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. The inks have excellent storage stability for a long period and do not clog in an ink jet apparatus. Fixing of the ink on the image recording material, such as, paper, fabric, film, etc., can be carried out speedily and surely. The printed ink images have clear color tones, high density, excellent water resistance and light fastness. Further the ink does not corrode parts of the ink jet printing device it comes in contact with, and it is essentially odorless, and non-toxic.

EXAMPLES

Polymer Preparation 1

A 5-liter flask was equipped with a mechanical stirrer, thermometer, $N_2$ inlet, drying tube outlet, and addition funnels. Tetrahydrofuran THF, 1104 gm, and mesitylene, 4.7 gm, were charged to the flask. The catalyst, tetrabutyl ammonium m-chlorobenzoate, 2.1 ml of a 1.0M solution in acetonitrile, was then added. Initiator, 1-methoxy-1-trimethylsiloxy-2-methyl propene, 26.0 gm (0.149M) was injected. Feed I [glycidyl methacrylate GMA, 254.8 gm (1.79M)] was started and added over 45 minutes. Feed II [methyl methacrylate MMA, 448.1 gm (4.48M) and butyl methacrylate BMA, 636.2 gm (4.48M)] was started at 75 minutes and added over 30 minutes.

At 195 minutes, 45.2 gm of water, 270.0 gm of p-nitrobenzoate NBA (1.62M), 34.0 gm of a 40% solution of benzyltrimethylammonium hydroxide, and 450.0 gm of propylene glycol methyl ether acetate were added to the above solution. The solution was distilled and 309.8 gm of solvent were removed. The solution was then held at reflux for a total of 430 minutes. Butyl acetate (900.0 gm) was then added to the polymer solution.

The polymer has a composition of GMA//MMA/BMA 12//30/30 and the epoxy groups have been reacted with nitrobenzoic acid. It has a molecular weight of Mn=11,000 and is at 42.2% solids.

Polymer Preparation 2

A 12-liter flask was equipped with a mechanical stirrer, thermometer, $N_2$ inlet, drying tube outlet, and addition funnels. Tetrahydrofuran THF, 3750 gm, and p-xylene, 7.4 gm, were charged to the flask. The catalyst tetrabutyl ammonium m-chlorobenzoate, 3.0 ml of a 1.0M solution in acetonitrile, was then added. Initiator, 1,1-bis(trimethylsiloxy)-2-methyl propene, 291.1 gm (1.25M) was injected. Feed I [tetrabutyl ammonium m-chlorobenzoate, 3.0 ml of a 1.0M solution in acetonitrile] was started and added over 180 minutes. Feed II [trimethylsilyl methacrylate, 1975 gm (12.5M)] was started at 0.0 minutes and added over 35 minutes. One hundred minutes after Feed II was completed (over 99% of the monomers had reacted), Feed III [benzyl methacrylate, 2860 gm (16.3M) was started and added over 30 minutes.

At 400 minutes, 720 gm of methanol were added to the above solution and distillation begun. During the first stage of distillation, 1764.0 gm of material were removed. Then more methanol 304.0 gm was added and an additional 2255.0 gm of material were distilled out. It was at 49.7% solids. The polymer had a composition of BZMA//MAA 13//10. It had a molecular weight of Mn=3,200.

Polymer Preparation 3

A 12-liter flask was equipped with a mechanical stirrer, thermometer, $N_2$ inlet, drying tube outlet, and addition funnels. Tetrahydrofuran THF, 2644 gm, and mesitylene, 5.2 gm, were charged to the flask. The catalyst, tetrabutyl ammonium m-chlorobenzoate, 2.5 ml of a 1.0M solution in acetonitrile, was then added. Initiator, 1-methoxy-1-trimethylsiloxy-2-methyl propene, 125.0 gm (0.718M) was injected. Feed I [dimethylaminoethyl methacrylate DMAEMA, 2258.0 gm (14.4M) and ethoxytriethyleneglycol methacrylate ETEGMA, 884.0 gm (3.59M)], was started and added over 40 minutes. Feed II [benzyl methacrylate BZMA, 1265 gm (7.18M)] was started at 100 minutes and added over 40 minutes.

At 250 minutes, 120 gm of methanol were added to the above solution and distillation begun. A total of 913.0 gm of solvent were removed. The polymer was at 69.5% solids, had a composition of BZMA//DMAEMA/ETEGMA 10//20/5, and a molecular weight of Mn=6,200.

Pigment Dispersion 1

A pigment dispersion chip was made by mixing the following ingredients:

| INGREDIENTS | AMOUNT (GM) |
|---|---|
| Polymer from Preparation 1 (42.2% solids) | 355.5 |
| Cyan pigment (BT617-D from Cookson Pigments Inc. Newark, NJ.) | 150.0 |
| Diethylene glycol (DEG) | 30.0 |

The pigment was dispersed using a conventional 2 roll mill and yielded a chip that contained 45% pigment, 45% polymer, and 10% DEG.

A 10% pigment dispersion solution was made by dissolving 100 grams of the chip with mixing in 350 grams of butyl acetate.

Pigment Dispersion 2

A pigment dispersion chip was made by mixing the following ingredients:

| INGREDIENTS | AMOUNT (GM) |
|---|---|
| Polymer from Preparation 1 (42.2% solids) | 355.5 |
| Cyan pigment (BT617-D from Cookson Pigments Inc. Newark, NJ.) | 150.0 |
| Diethylene glycol (DEG) | 30.0 |

The pigment was dispersed using a conventional 2 roll mill and yielded a chip that contained 45% pigment, 45% polymer, and 10% DEG.

A 10% pigment dispersion solution was made by dissolving 100 grams of the chip with mixing in 350 grams of DBE dibasic ester (dimethyl esters of a mixture of C4, C5, and C6 diacids).

Pigment Dispersion 3

A pigment dispersion chip was made by mixing the following ingredients:

| INGREDIENTS | AMOUNT (GM) |
|---|---|
| Polymer from Preparation 1 (42.2% solids) | 355.5 |
| Magenta pigment (RT-343-D from Ciba Geigy) | 150.0 |
| Diethylene glycol (DEG) | 30.0 |

The pigment was dispersed using a conventional 2 roll mill and yielded a chip that contained 45% pigment, 45% polymer, and 10% DEG.

A 10% pigment dispersion solution was made by dissolving 100 grams of the chip with mixing in 350 grams of DBE (dibasic ether).

Pigment Dispersion 4

A pigment dispersion chip was made by mixing the following ingredients:

| INGREDIENTS | AMOUNT (GM) |
|---|---|
| Polymer from Preparation 1 (42.2% solids) | 355.5 |
| Black pigment (Special Black 6 from Degussa Inc. Allendale, NJ) | 150.0 |
| Diethylene glycol (DEG) | 30.0 |

The pigment was dispersed using a conventional 2 roll mill and yielded a chip that contained 45% pigment, 45% polymer, and 10% DEG.

A 10% pigment dispersion solution was made by dissolving 100 grams of the chip in 350 grams of 1-Phenoxy-2-propanol, Dowanol® PPH from Dow Chemical Corporation, Midland, Mich.

Ink Example 1

An ink was prepared by pre-mixing 40 grams of pigment dispersion 1 with 13.2 grams of polymer preparation 2 and then adding:

| INGREDIENTS | AMOUNT (GM) |
|---|---|
| Water | 123.8 |
| 45% KOH | 3.04 |
| Diethylene glycol | 10.0 |
| Liponics EG-1 (Lipo Chemical Co., Paterson, NJ) | 10.0 |

The mixture was homogenized using a conventional homogenizer to produce an anionic cyan ink comprising a continuous aqueous phase and a discontinuous non-aqueous pigment dispersion phase. The ink contained 2% pigment and 16% non-water soluble solvent (butyl acetate).

Ink Example 2

An ink was prepared using the same formulation as in Ink Example 1 except that pigment dispersion 2 was used. This produced an anionic cyan ink comprising a continuous aqueous phase and a discontinuous non-aqueous pigment dispersion phase. The ink contained 2% pigment and 16% non-water soluble solvent (dimethyl esters).

Ink Example 3

An ink was prepared using the same formulation as in Ink Example 1 except that pigment dispersion 3 was used. This produced an anionic magenta ink comprising a continuous aqueous phase and a discontinuous non-aqueous pigment dispersion phase. The ink contained 2% pigment and 16% non-water soluble solvent (dimethyl esters).

Ink Example 4

An ink was prepared using the same formulation as in Ink Example 1 except that pigment dispersion 4 was used. This produced an anionic black ink comprising a continuous aqueous phase and a discontinuous non-aqueous pigment dispersion phase. The ink contained 2% pigment and 16% non-water soluble solvent (1-phenoxy-2-propanol).

Ink Example 5

An ink was prepared by pre-mixing 40 grams of pigment dispersion 2 with 9.49 grams of polymer preparation 3 and then adding:

| INGREDIENTS | AMOUNT (GM) |
|---|---|
| Water | 129.84 |
| 85% Phosphoric Acid | 0.67 |
| Diethylene glycol | 10.0 |
| Liponics EG-1 | 10.0 |
| (Lipo Chemical Co., Paterson, NJ) | |

The mixture was homogenized using a conventional homogenizer to produce a cationic cyan ink comprising a continuous aqueous phase and a discontinuous non-aqueous pigment dispersion phase. The ink contained 2% pigment and 16% non-water soluble solvent (mixed methyl esters).

Ink Example 6

An ink was prepared using the same formulation as in Ink Example 5 except that pigment dispersion 3 was used. This produce a cationic magenta ink comprising a continuous aqueous phase and a discontinuous non-aqueous pigment dispersion phase. The ink contained 2% pigment and 16% non-water soluble solvent (dimethyl esters).

Control Ink 1

A pigment dispersion chip was made by mixing the following ingredients:

| INGREDIENTS | AMOUNT (GM) |
|---|---|
| Polymer from Preparation 2 | 301.8 |
| (49.7% solids) | |
| Yellow pigment | 150.0 |
| (Sunbrite Y13 from Sun Chemical Corp., Cincinnati, OH) | |
| Diethylene glycol (DEG) | 30.0 |

The pigment was dispersed using a conventional 2 roll mill and yielded a chip that contained 45% pigment, 45% polymer, and 10% DEG.

A 10% pigment dispersion solution was made by mixing:

| INGREDIENTS | AMOUNT (GM) |
|---|---|
| Pigment dispersion chip | 100 |
| 45% KOH | 17.0 |
| Water | 333.0 |

An ink was made by mixing:

| INGREDIENTS | AMOUNT (GM) |
|---|---|
| Pigment dispersion described above | 30.0 |
| Liponics EG-1 | 5.0 |
| (Lipo Chemical Co., Paterson, NJ) | |
| 2-Pyrrolidone | 9.0 |
| Water | 56.0 |

This made an anionic, aqueous control ink that contained 3% yellow pigment.

Control Ink 2

The same formulation was used as in Control ink 1 except that cyan pigment (BT617-D from Cookson Pigments) was used in place of the yellow pigment.

Control Ink 3

The same formulation was used as in Control ink 1 except that magenta pigment (RT-343-D from Ciba Geigy) was used in place of the yellow pigment.

Control Ink 4

The same formulation was used as in Control ink 1 except that black pigment (FW18 from Degussa) was used in place of the yellow pigment.

Control Ink 5

A pigment dispersion chip was made by mixing:

| INGREDIENTS | AMOUNT (GM) |
|---|---|
| Polymer from Preparation 3 | 215.8 |
| (69.5% solids) | |
| Cyan pigment | 150.0 |
| (BT617-D from Cookson Pigments Inc. Newark, NJ) | |
| Diethylene glycol (DEG) | 30.0 |

The pigment was dispersed using a conventional 2 roll mill and yielded a chip that contained 45% pigment, 45% polymer, and 10% DEG.

A 10% pigment dispersion solution was made by mixing:

| INGREDIENTS | AMOUNT (GM) |
|---|---|
| Pigment dispersion chip | 100 |
| 85% Phosphoric Acid | 15.2 |
| Water | 334.8 |

An ink was made by mixing:

| INGREDIENTS | AMOUNT (GM) |
|---|---|
| Pigment dispersion described above | 30.0 |
| Tetraethyleneglycol | 10.0 |
| 2-pyrrolidone | 6.0 |
| Multranol ® 4012, (Bayer Chemical) | 2.5 |
| Water | 51.5 |

This made an cationic, aqueous control ink that contained 3% cyan pigment.

Control Ink 6

The same formulation was used as in Control Ink 5 except that yellow pigment (Sunbrite® Y13 from Sun Chemical) was used in place of the cyan pigment.

Print Quality

All of the above inks were printed using a Hewlett Packard Desk Jet Ink jet printer onto standard office bond paper and tested for water fastness and resistance to smear from highlighters. Results are reported in Table 1.

TABLE 1

| Ink | Water Fastness | Smear Resistance |
|---|---|---|
| Example 1 | Excellent | Excellent |
| Example 2 | Excellent | Excellent |
| Example 3 | Excellent | Excellent |
| Example 4 | Excellent | Excellent |
| Example 5 | Excellent | Excellent |
| Example 6 | Excellent | Excellent |
| Control 2 | Very poor | Poor |
| Control 3 | Very poor | Poor |
| Control 5 | Very poor | Poor |

Inks were rated excellent for waterfastness if there was no streaking of the ink when water is run over a printed section 1 minute after printing. Very poor waterfastness means that there is a lot of streaking of the ink when water is run over a printed section 1 minute after printing. There is almost as much ink in the water stream as that remaining on the printed section.

A rating of excellent for smear resistance means was given when no streaking of the ink was observed when a highlighter is run over a printed section 1 minute after printing. Poor smear resistance means that there is a lot of streaking of the ink when a highlighter is run over a printed section 1 minute after printing.

The results in Table 1 show that the inks of this invention had excellent resistance to water and highlighter smear. This is true for both anionic and cationic inks. The controls, which used similar pigments and were either anionic or cationic had poor resistance to water and highlighter smear.

The inks described above were also tested for bleed. Resuts are shown in Table 2.

TABLE 2

| Ink set | Bleed performance |
|---|---|
| Ink 3 and Ink 5 | Excellent |
| Ink 3 and Control 4 | Excellent |
| Ink 5 and Control 6 | Excellent |
| Control 3 and Control 4 | Poor |
| Control 5 and Control 6 | Poor |

The results in Table 2 show that excellent bleed was obtained when the ink set consisted of at least one ink of this invention. This is perhaps best observed by comparing the bleed between Ink 3 and Control Ink 4 vs. Control Ink 3 and Control Ink 4. In each case, both inks are anionic. When one of the anionic inks was the ink of this invention, however, the bleed was dramatically improved. The same observation is made for cationic inks when comparing the bleed between Ink 5 and Control Ink 6 vs. Control Ink 5 and Control Ink 6.

What is claimed is:

1. An ink jet ink composition comprising:

(a) an aqueous continuous phase;

(b) a discontinuous, non-aqueous phase comprising a pigment, a dispersant and a non-aqueous carrier; and (c) at least one polymeric emulsifier.

2. The ink composition of claim 1, wherein the aqueous continuous phase comprises a mixture of water and a polyhydric alcohol.

3. The ink composition of claim 2, wherein the aqueous continuous phase comprises from 60% to 95%, by weight, water.

4. The ink composition of claim 1, wherein the aqueous continuous phase comprises 25% to 99.8%, by weight, of the ink composition.

5. The ink composition of claim 1, wherein the pigment comprises 1% to 30%, by weight, of the ink composition.

6. The ink composition of claim 1, wherein the dispersant is selected from the group consisting of block and graft polymers.

7. The ink composition of claim 1, wherein the dispersant comprises 0.1% to 10%, by weight, of the ink composition.

8. The ink composition of claim 1, wherein the non-aqueous carrier comprises a water insoluble organic solvent selected from the group consisting of esters, ketones, ethers, aromatics, hydrocarbons, and alcohols.

9. The ink composition of claim 1, wherein the at least one polymeric emulsifier comprises 0.01% to 10%, by weight, of the ink composition.

10. The ink composition of claim 1, further comprising at least one additive selected from the group consisting of biocides, sequestering agents, humectants, viscosity modifiers, additional polymers and dyes.

* * * * *